Figure 3:
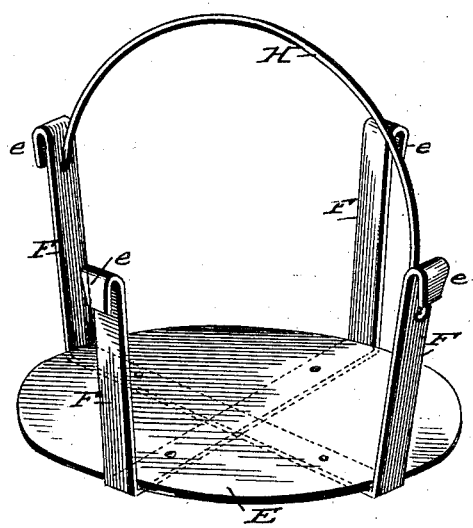

No. 700,961. Patented May 27, 1902.
J. P. LYNOTT.
HEATING OR COOKING ATTACHMENT FOR STOVES.
(Application filed Mar. 11, 1902.)
(No Model.) 2 Sheets—Sheet 1.
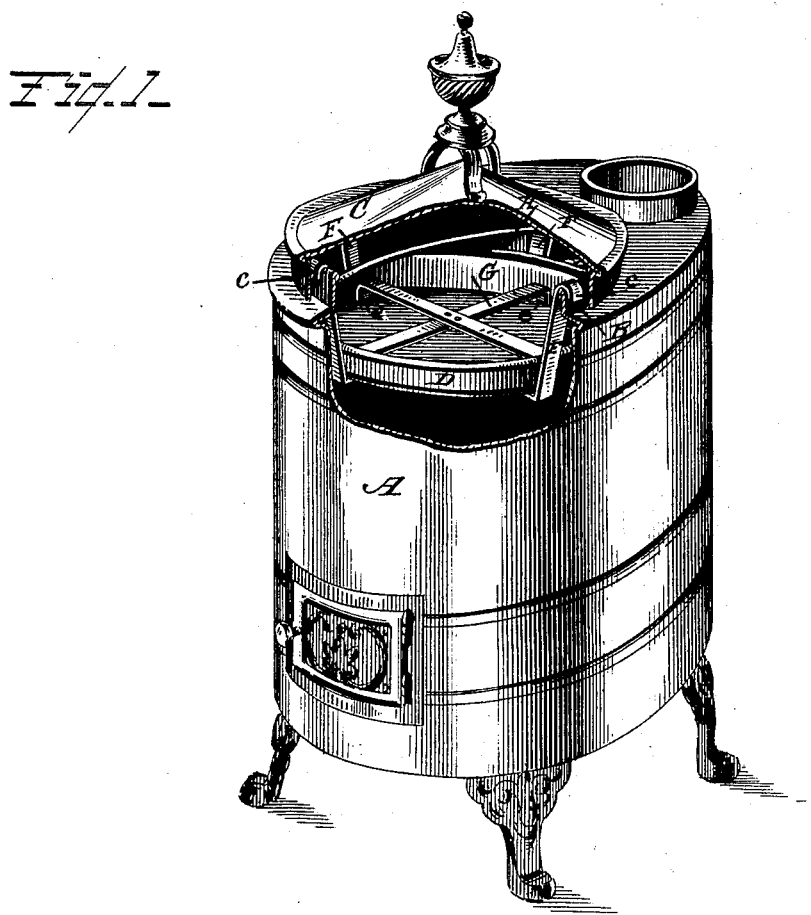
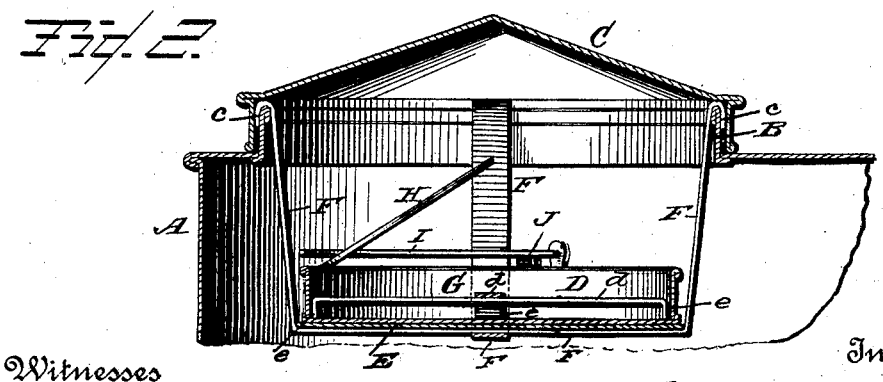
Witnesses
C. J. Williamson
M. E. Moore
Inventor
John P. Lynott.
per Chas. H. Fowler
Attorney No. 700,961. Patented May 27, 1902.
J. P. LYNOTT.
HEATING OR COOKING ATTACHMENT FOR STOVES.
(Application filed Mar. 11, 1902.)

(No Model.) 2 Sheets—Sheet 2.

Witnesses
C. J. Williamson
M. E. Moore

Inventor
John P. Lynott.
per Chas. H. Fowler
Attorney

THE NORRIS PETERS CO., PHOTO-LITHO., WASHINGTON, D. C.

UNITED STATES PATENT OFFICE.

JOHN P. LYNOTT, OF LOUISIANA, MISSOURI.

HEATING OR COOKING ATTACHMENT FOR STOVES.

SPECIFICATION forming part of Letters Patent No. 700,961, dated May 27, 1902.

Application filed March 11, 1902. Serial No. 97,686. (No model.)

*To all whom it may concern:*

Be it known that I, JOHN P. LYNOTT, a citizen of the United States, residing at Louisiana, in the county of Pike and State of Missouri, have invented certain new and useful Improvements in Heating or Cooking Attachments for Stoves; and I do hereby declare that the following is a full, clear, and exact description of the same, reference being had to the annexed drawings, making a part of this specification, and to the letters of reference marked thereon.

The present invention has relation to oven attachments for stoves for heating and cooking purposes and which may be readily removed from the stove when not required for use; and it consists in an oven attachment constructed substantially as shown in the drawings and hereinafter described and claimed.

Figure 4:
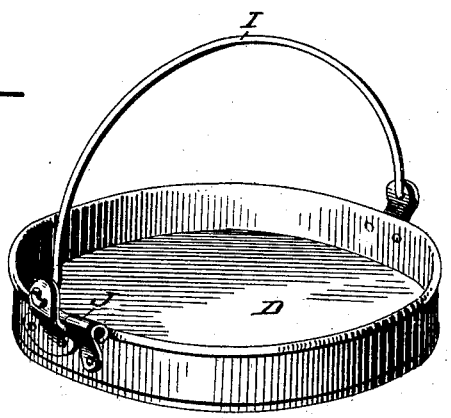
Figure 5:
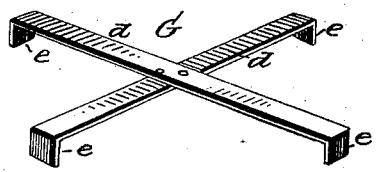

Figure 1 of the drawings is a perspective view of a stove with a portion thereof partly broken away to show the position and construction of the oven attachment; Fig. 2, a sectional elevation, on an enlarged scale, of the upper portion of the heating-stove and the oven attachment thereto; Fig. 3, a perspective view of the support for the oven or cooking-receptacle for containing the articles to be heated or cooked; Fig. 4, a similar view of the oven or cooking-receptacle; Fig. 5, a similar view of the supporting-bars to retain the articles from contact with the bottom of the oven or cooking-receptacle.

In the accompanying drawings, A represents a suitable stove, preferably a heating-stove and adapted to receive wood as a heating medium, said stove at its top having a suitable opening surrounded by an upwardly-extending rim B and a lid or cover C to close the opening.

The attachment to the stove comprises in part a suitable oven or cooking-receptacle D, provided with a swinging bail I for lifting or handling the same and when the bail is not required for use is swung down and is supported from contact with the oven or cooking-receptacle by the rest J. This oven or cooking-receptacle is suspended in the stove by a support E, which is provided with upwardly-extending hangers F, two of which are provided with a swinging bail H for convenience of handling the support. These hangers F have hooks c at their upper ends to catch over the rim B of the stove, as shown in Figs. 1 and 2 of the drawings, each pair of hangers being formed of a continuous strip of metal extending under the support and suitably fastened thereto, whereby the support is reinforced and strengthened and prevented from warping or buckling by the action of the heat.

The oven or cooking-receptacle D rests on the support E and is suspended thereby wholly within the stove, as it hangs lower than the top of the stove, and consequently the hot air is enabled to circulate freely over and around the oven or cooking-receptacle without escaping, the opening in the top of the stove being of course closed by the lid or cover C.

There are no perforations required in the oven or cooking-receptacle to allow the circulation of the heated air, as the oven or receptacle is much below the top of the stove, and the sides of said oven or receptacle do not obstruct the circulation of the heated air above and around the same and this without having to perforate the sides of the oven or receptacle for the passage of the heated air.

I do not wish to limit the invention to any particular number of the hangers F or any special construction of the oven or cooking-receptacle D, as such changes as would come within ordinary mechanical judgment may be resorted to without in any manner departing from the essential features of the invention.

The oven or cooking-receptacle may be used for many purposes, such as baking, cooking, roasting, boiling, and for heating irons, &c.

The rack G is constructed from strips d of metal secured together and have downwardly-extending feet e to rest on the bottom of the oven or cooking-receptacle D.

The rack G when resting on the bottom of the oven or cooking-receptacle D prevents the articles from coming in contact with the bottom thereof and burning, thereby removing the necessity of the use of asbestos as a filling for the bottom of the oven or cooking-receptacle, no double disks to form the bottom thereof being required.

The attachment as herein described may be constructed at a comparatively small cost and will fit any stove in which the opening in the top thereof is of sufficient size and when not in use may be readily removed from the stove, the oven or cooking-receptacle and also the support therefor being lifted out by their respective bails when no longer required for use, or the oven or cooking-receptacle may be lifted out with its contents without disturbing the support, as circumstances require.

The rest J upon the rim of the oven or cooking-receptacle D supports the bail I above the rim and from contact with the same, so that it may be readily taken hold of when the oven or receptacle is to be removed, which otherwise would be very inconvenient if the bail was down against the rim in the heated condition of the oven or receptacle.

Having now fully described my invention, what I claim as new, and desire to secure by Letters Patent, is—

1. In a heating or cooking attachment for stoves, the combination with a suitable oven or cooking-receptacle, of a support therefor, said support comprising a metal disk and a plurality of hangers extending up therefrom and terminating in hooks, said hangers being formed of strips of metal extending under the metal disk or support and secured thereto, substantially as and for the purpose described.

2. A heating or cooking attachment for stoves, comprising a support having upwardly-extending hooked hangers to engage the rim around the stove-opening, an oven or cooking-receptacle adapted to rest upon the support and provided with a swingable bail and an upwardly-extending rest therefor, and a suitable rack to rest upon the bottom of the oven or receptacle, substantially as and for the purpose set forth.

In testimony that I claim the above I have hereunto subscribed my name in the presence of two witnesses.

JOHN P. LYNOTT.

Witnesses:
GEO. E. LYNOTT,
E. McCUEN.